(12) United States Patent
Takeda et al.

(10) Patent No.: US 7,015,157 B2
(45) Date of Patent: *Mar. 21, 2006

(54) NON-HALOGEN SERIES FLOOR MATERIAL

(75) Inventors: Junichi Takeda, Nara (JP); Hiroaki Ishii, Nara (JP)

(73) Assignee: Suminoe Textile Co., Ltd., Osaka (JP)

( * ) Notice: Subject to any disclaimer, the term of this patent is extended or adjusted under 35 U.S.C. 154(b) by 181 days.

This patent is subject to a terminal disclaimer.

(21) Appl. No.: 10/367,977

(22) Filed: Feb. 19, 2003

(65) Prior Publication Data

US 2004/0161995 A1    Aug. 19, 2004

(51) Int. Cl.
*B32B 5/06* (2006.01)
*B32B 5/26* (2006.01)

(52) U.S. Cl. ............... 442/389; 442/381; 442/382; 442/393; 442/394; 442/398; 442/401; 442/417

(58) Field of Classification Search ............... 442/401, 442/381, 382, 389, 393, 394, 398, 417
See application file for complete search history.

(56) References Cited

U.S. PATENT DOCUMENTS 5,834,087 A * 11/1998 Kajikawa et al. ............ 428/95

FOREIGN PATENT DOCUMENTS

| JP | 06-105737 | | 4/1994 |
|----|-----------|---|--------|
| JP | 11-48416 | | 2/1999 |
| JP | 11-48416 | * | 11/1999 |
| JP | 2000-226933 | * | 8/2000 |
| JP | 2002-283904 | * | 8/2000 |
| JP | 2000-226933 | * | 10/2002 |
| JP | 2002-283904 | * | 10/2002 |

OTHER PUBLICATIONS

Japanese Office Action dated Dec. 24, 2003.

* cited by examiner

*Primary Examiner*—Norca L. Torres-Velazquez
(74) *Attorney, Agent, or Firm*—Armstrong, Kratz, Quintos, Hanson & Brooks, LLP

(57) ABSTRACT

A non-halogen series floor material includes an intermediate resin layer containing filler, resin having no chlorine atom in chemical structure as a primary resin ingredient and amorphous poly α-olefin resin whose number average molecular weight is 20,000 or less. The content of the amorphous poly α-olefin resin is 5 to 40% by weight with respect to entire resin ingredients. On the upper surface of the intermediate resin layer, a surface resin layer having a thickness of 30 to 1,000 μm is integrally formed. The surface resin layer includes no chlorine atom in chemical constitution. On the lower surface of the intermediate layer, a heat shrinkage-characteristic cloth is integrally formed by heating it to form a backing layer. This provides a non-halogen floor material that hardly generates toxic gases at the time of burning, can be manufactured at a low cost and is excellent in wear resistance, stain resistance, dimensional stability and workability.

12 Claims, 1 Drawing Sheet

NON-HALOGEN SERIES FLOOR MATERIAL

BACKGROUND OF THE INVENTION

1. Field of the Invention

The present invention relates to a non-halogen series floor material. More specifically, it relates to a non-halogen series floor material preferably used as a floor material for use in architectural structures including buildings, condominiums and commercial facilities or vehicle floor material of trains or buses, wherein the non-halogen floor material hardly generates toxic gases at the time of burning and is excellent in wear resistance, stain resistance, dimensional stability and workability.

2. Description of Related Art

The following description sets forth the inventor's knowledge of related art and problems therein and should not be construed as an admission of knowledge in the prior art.

Conventionally, as a floor material for use in architectural structures including buildings, condominiums and commercial facilities or vehicle floor material of trains or buses, a floor material made of polyvinyl chloride (PVC) resin is widely used. Since such PVC floor material is excellent in wear resistance and can contain a large amount of filler, the floor material is excellent in dimensional resistance and economical because the material costs can be decreased by increasing the amount of filler.

However, a PVC floor material generates a large amount of smoke and toxic gases such as hydrogen chloride at the time of burning. Accordingly, this causes difficulties from the viewpoint of disaster prevention because evacuees may inhale such toxic gases at the time of fire disaster and also causes environment pollution when incinerating such floor materials. Furthermore, since such a PVC floor material contains a large amount of plasticizer, there are problems that the floor material emits specific odor, the flexibility as a floor material gradually deteriorates as the plasticizer evaporates and the appearance gradually deteriorates because the plasticizer gradually causes dull deposits on the surface thereof.

Recently, there is a proposal to use the following material that generates less toxic gases at the time of burning for a floor material in place of the aforementioned PVC material. The material includes, for example, olefin series thermoplastic resin such as ethylene series copolymer including polypropylene resin, polyethylene resin, ethylene-ethyl acrylate copolymer, ethylene-metacrylate copolymer and ethylene-vinyl acetate copolymer and polybutene-1, acrylic series thermoplastic resin such as poly methyl meta-crylate, copolymer of poly methyl meta-crylate and acrylic rubber, polyurethane series thermoplastic resin, olefin series thermoplastic elastomer, and styrene series thermoplastic elastomer and urethane series thermoplastic elastomer. By using these materials for a floor material, the aforementioned problems including generation of toxic gases at the time of burning, odor inherent in plasticizer and dull deposits on the surface thereof can be almost solved.

However, in the latter conventional technique, since a large amount of filler cannot be contained, there are problems that the floor material is inferior to a conventional PVC floor material in dimensional stability and that the manufacturing costs increase as compared to a conventional PVC floor material. Furthermore, the material lacks flexibility, resulting in poor workability.

SUMMARY OF THE INVENTION

It is an object of the present invention to provide a non-halogen floor material that hardly generates toxic gases at the time of burning, can be manufactured at a low cost and is excellent in wear resistance, stain resistance, dimensional stability and workability.

The aforementioned object can be attained by a non-halogen series floor material comprising an intermediate resin layer containing filler, resin (except for amorphous poly α-olefin resin whose number average molecular weight is 20,000 or less) having no chlorine atom in chemical structure as a primary resin ingredient and amorphous poly α-olefin resin whose number average molecular weight is 20,000 or less, the content of the amorphous poly α-olefin resin being 5 to 40% by weight with respect to entire resin ingredients, a surface resin layer having a thickness of 30 to 1,000 μm integrally formed on an upper surface of the intermediate resin layer, the surface resin layer including no chlorine atom in chemical constitution, and a backing layer integrally formed on a lower surface of the intermediate resin layer, the backing layer being a heat-melted heat shrinkage-characteristic cloth.

According to this floor material, since resin having no chlorine atom in chemical structure is used, the floor material generate less toxic gases at the time of burning, which is excellent in burning safety and environment conservation. Furthermore, since the surface resin layer is made of resin, the surface of the floor material is excellent in wear resistance and stain resistance. In addition, since the thickness of the surface resin layer is set to fall within the range of 30 to 1,000 μm, the dimensional stability and the up-curvature generation prevention can be improved while securing the excellent wear resistance. Further, since the intermediate resin layer contains filler, the floor material is excellent in dimensional stability. Furthermore, since the amorphous poly α-olefin resin whose number average molecular weight is 20,000 or less is contained as resin constituting the intermediate resin layer by 5 to 40% by weight with respect to the entire resin ingredients constituting the intermediate resin layer, a large amount of filler can be contained, resulting in improved dimensional stability and flexibility, which in turn can improve the workability of the floor material. Furthermore, the heat shrinkage-characteristic cloth is heat-melted to thereby integrally form a backing layer on the lower surface of the intermediate resin layer in the state that strain causing shrinkage of the cloth remains. Therefore, the up-curvature of the floor material can be effectively prevented. In addition, since it is not required to contain plasticizer, the specific odor will not be emitted and that dull deposits will not gradually generate on the surface of the floor material.

It is preferable that the surface resin layer is a monolayer structure containing olefin series resin as a main resin ingredient or a lamination structure in which at least the uppermost surface layer contains olefin series resin as a main resin ingredient. The employment of the olefin series resin dramatically improves the wear resistance and the stain resistance of the floor surface.

Especially, it is more preferable that the surface resin layer is a monolayer structure containing polypropylene resin as a main resin ingredient or a lamination structure in which at least the uppermost surface layer contains polypropylene resin as a main resin ingredient. Since at least the uppermost surface layer of the surface resin layer contains polypropylene resin as a main resin ingredient, the stain resistance and the wear resistance can be further enhanced.

Furthermore, in cases where a lamination structure is employed, if the layer in contact with this uppermost surface layer contains polyethylene resin or ethylene-polyvinyl acetate resin as a main resin ingredient, enough flexibility can be given to the floor material while keeping the aforementioned characteristics (excellent stain resistance and wear resistance).

It is preferable that the amount of the filler contained in the intermediate resin layer is 100 to 400 weight parts with respect to 100 weight parts of resin constituting the intermediate resin layer. This enables to provide a floor material having further enhanced excellent flexibility and enough dimensional stability.

It is preferable that a heat shrinkage ratio of the heat shrinkage-characteristic cloth in a shape of cloth before being heat-melted is larger than 0% but not larger than 5% at 150° C. This effectively prevents generation of up-curvature of the floor material and further enhances the fitting stability of the floor material since the floor material tends to be curved upwardly.

In order to improve the fitting stability while effectively preventing the up-curvature of the floor material, it is preferable that the weight per square unit area of the backing layer falls within the range of 20 to 150 g/m².

Other objects and features will be apparent from the following detailed description of the present invention with reference to the attached drawing.

BRIEF DESCRIPTION OF THE DRAWINGS

The accompanying figures are provided by way of example, without limiting the broad scope of the invention or various other embodiments, wherein.

DETAILED DESCRIPTION OF THE PREFERRED EMBODIMENTS

Figure 1:
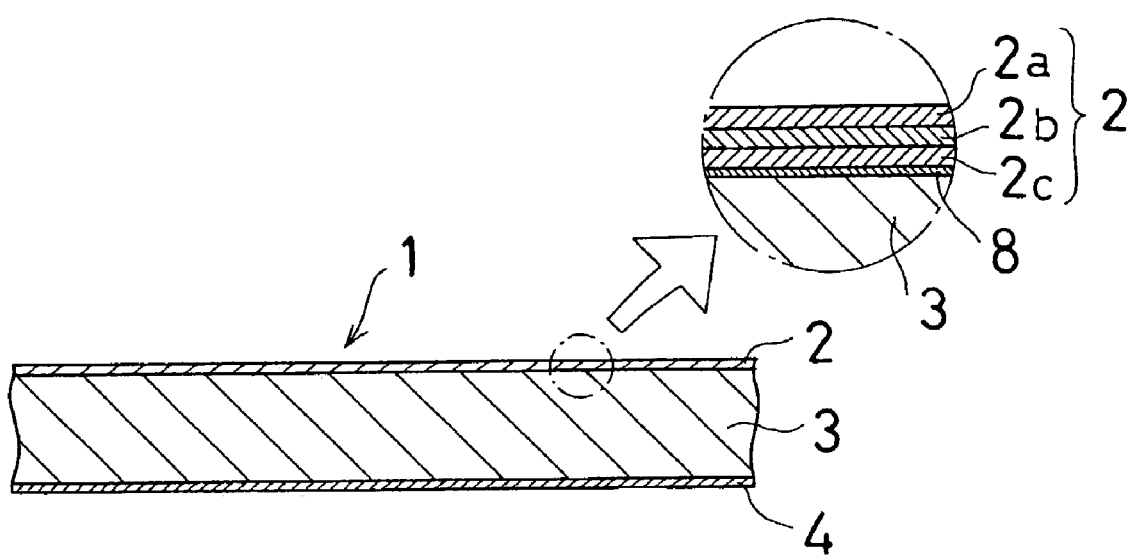
FIG. 1 is a cross-sectional view showing a floor material according to an embodiment of the present invention.

An embodiment of the non-halogen series floor material according to the present invention will be explained with reference to the attached drawing. This non-halogen series floor material 1 includes an intermediate resin layer 3, a surface resin layer 2 integrally laminated on the upper surface resin layer 2 and a backing layer 4 integrally formed on the lower surface of the intermediate resin layer 2 by being heat-melted, as shown in FIG. 1. The intermediate resin layer 3 contains filler, resin having no chlorine atom in chemical structure as a primary resin ingredient and amorphous poly α-olefin resin whose number average molecular weight is 20,000 or less. The content of the amorphous poly α-olefin resin is 5 to 40% by weight with respect to the entire resin ingredients. The surface resin layer 2 includes no chlorine atom in chemical constitution. The backing layer 4 is a heat-melted heat shrinkage-characteristic cloth.

The surface resin layer 2 is made of resin composite containing resin having no chlorine atom in chemical structure. In this specification, the aforementioned "resin composite" includes composite constituted by resin only. Since the surface resin layer is made of such resin, the surface of the floor material 1 is excellent in wear resistance and stain resistance. Furthermore, since the resin has no chlorine atom in chemical structure, toxic gases hardly generate at the time of burning.

The resin having no chlorine atom in chemical structure is limited to a specific one. However, for example, thermoplastic resin such as polypropylene resin and polyethylene resin, or thermoplastic elastomer such as olefin series thermoplastic elastomer and styrene series thermoplastic elastomer may be preferably used. Especially, it is preferable to use olefin series resin as a main ingredient of the resin component since this resin can improve the wear resistance and the stain resistance of the surface of the floor material 1.

The surface resin layer 2 may be a monolayer structure or a multilayer structure so long as the surface resin layer is made of the aforementioned resin composite. Especially, it is preferable that the surface resin layer 2 is a monolayer structure containing polypropylene resin as a main resin ingredient or a lamination structure in which at least the uppermost surface layer contains polypropylene resin as a main resin ingredient. In this case, since the uppermost layer of the surface resin layer contains polypropylene resin as a main resin ingredient, even if dirt is adhered to the surface, such dirt can be easily wiped away, which enables to further enhance the stain resistance and the wear resistance. In cases where the aforementioned lamination structure is employed, if the layer in contact with the uppermost layer contains polypropylene resin or ethylene-vinyl acetate resin as a main resin ingredient, enough flexibility can be given while keeping the aforementioned characteristics (i.e., excellent stain resistance and wear resistance). Concretely, a monolayer structure made of polypropylene resin, a double-layer structure including an upper layer made of polypropylene resin and a lower layer made of polyethylene resin, or a triple-layer structure including an uppermost layer 2a made of polypropylene resin, an intermediate layer 2b made of polyethylene resin and a lowermost layer 2c made of polypropylene resin as shown in FIG. 1 can be exemplified. In cases where the aforementioned triple-layer structure is employed, it is preferable that the uppermost layer 2a and the lowermost layer 2c are made of the same type of resin from the viewpoint of preventing generation of curvature.

In this invention, in order to improve the ornamentation, a printed design may be given to the upper or lower surface of the surface resin layer 2 or within the surface resign layer 2. However, in the present invention, the means for giving ornamentation will not be limited to the above so long as a printed design can be seen from the surface side of the floor material 1. Among other things, it is more preferable to laminate a print layer 8 such as a pattern print layer on the lower surface of the surface resin layer 2. In this case, it is prevented that the print layer 8 is damaged or exfoliated during the usage, resulting in long-life ornamentation. The printing method for giving print patterns or the like is not limited to a specific one and may be, for example, an ink jet printing method, a gravure printing method, a screen printing method or a transfer printing method.

As another means for improving the ornamentation, a means for mixing pattern-forming members within the surface resin layer 2 can be exemplified. By mixing such pattern-forming members in the surface resin layer 2, the pattern-forming members can be included randomly within the transparent or half-transparent surface resin layer 2, causing a deep pattern.

The aforementioned pattern-forming member is not limited to a specific one, but may be any known pattern-forming member. It is preferable that the pattern-forming member is a grain member made thermosetting urea resin or thermoplastic polyester resin, an angular or flake-shaped chip made of cellulose or aluminum as a main ingredient or a needle-like member made of cellulose as a main ingredient. These pattern-forming members may be used in an independent manner or in a combined manner.

In cases where such pattern-forming members are mixed, it is preferable that the mixing amount is 30% by weight or less, more preferably 10% by weight or less, with respect to the entire weight of the surface resin layer 2. If the mixing amount of pattern-forming member exceeds 30% by weight, it may be difficult to obtain a deep and beautiful pattern on the surface resin layer 2.

In place of pattern-forming members or in addition to pattern-forming members, coloring pigment may be mixed in the surface resin layer 2. In cases where coloring pigment is mixed, it is preferable to control so that the mixing amount falls within the range of 0.1 to 5% by weight with respect to the entire weight of the surface resin layer 2 because of the following reasons. If the amount is less than 0.1% by weight, enough coloring cannot be obtained. To the contrary, if the amount exceeds 5% by weight, the property of the surface resin layer 2 may deteriorate.

The surface resin layer 2 may be constituted by a combination of a layer in which pattern-forming member is mixed and a colored layer in which pigment is mixed, or a multi-layer structure of these layers. Of course, in addition to the aforementioned print layer 8, the pattern-forming member mixed layer and/or the colored layer may be used. In order to further improve the ornamentation, the surface resin layer 2 may have a patterned indented surface.

If necessary, processing agent may be applied on the surface of the floor material 1, or the upper surface of the surface resin layer 2, to thereby form a film. For example, from the viewpoint of improving the wear resistance, a film containing urethane series resin or acrylic series resin as a main ingredient may be formed on the upper surface of the surface resin layer 2. Such a film is generally formed to have a thickness of 50 $\mu$m or less.

The thickness of the surface resin layer 2 should fall within the range of 30 to 1,000 $\mu$m. If the thickness is less than 30 $\mu$m, the wear resistance deteriorates. To the contrary, if the thickness exceeds 1,000 $\mu$m, the floor material 1 tends to curve upwardly and deteriorates in dimensional stability. Especially, it is preferably that the thickness of the surface resin layer 2 is 200 to 600 $\mu$m.

The intermediate resin layer 3 is constituted by resin composite containing filler, resin (except for amorphous poly $\alpha$-olefin resin whose number average molecular weight is 20,000 or less) having no chlorine atom in chemical structure as a primary resin ingredient and amorphous poly $\alpha$-olefin resin whose number average molecular weight is 20,000 or less contained by 5 to 40% by weight with respect to entire resin ingredients.

Since the filler is contained in the intermediate resin layer 3, the dimensional stability as a floor material 1 can be improved and the cost can be decreased due to the large amount of the filler contained. Furthermore, since the resin having no chlorine atom in chemical structure is contained as a primary resin ingredient, toxic gases hardly generate at the time of burning. Furthermore, since the amorphous poly $\alpha$-olefin resin whose number average molecular weight is 20,000 or less is contained by 5 to 40% by weight with respect to entire resin ingredients constituting the intermediate resin layer, it becomes possible to mix a large amount of filler. This remarkably improves the dimensional stability and gives enough flexibility as a floor material 1, resulting in improved workability of a floor material. If the amount is less than 5% by weight, it becomes difficult to contain a large amount of filler, and almost no flexibility improvement can be obtained. If the amount exceeds 40% by weight, the workability, the heat resistance, the strength and the dimension stability deteriorate to be inappropriate as a floor material. It is preferable that amorphous poly $\alpha$-olefin resin whose number average molecular weight is 20,000 or less is contained by 15 to 25% by weight with respect to the entire resin ingredients of the intermediate resin layer. Furthermore, it is preferable that the number average molecular weight of the amorphous poly $\alpha$-olefin resin falls within the range of 1,000 to 10,000. By setting the molecular weight as mentioned above, the flexibility as a floor material 1 can be further improved, resulting in further improved workability as a floor material.

The resin having no chlorine atom in chemical structure constituting the intermediate resin layer 3 is not limited to a specific one, but may be (a) thermoplastic resin such as homo-polypropylene resin, block-polypropylene resin, random polypropylene resin, low density polyethylene resin, super-low density polyethylene resin, high-density polyethylene resin, straight chain-like polyethylene resin, ethylene-vinyl acetate copolymer, ethylene-$\alpha$ olefin copolymer, ethylene series copolymer, etc., (b) thermoplastic elastomer such as olefin series thermoplastic elastomer including a flexibility layer made of ethylene-propylene rubber and a hard layer made of polyethylene resin or polypropylene resin or styrene series thermoplastic elastomer, or (c) rubber series component such as styrene-butadiene rubber, isoprene rubber, chloroprene rubber. Especially, olefin series resin can be suitably used as the resin having no chlorine atom in chemical structure constituting the intermediate resin layer 3.

The amorphous poly $\alpha$-olefin resin whose number average molecular weight is 20,000 or less is not limited to a specific one, but may be, for example, amorphous polypropylene resin, amorphous propylene-ethylene copolymer resin or amorphous propylene butene-1 copolymer resin.

The filler is not limited to a specific one, and may be a conventional known filler for use in a floor material. For example, calcium carbonate, barium sulfate, aluminum hydroxide, magnesium hydroxide, clay, talc, alumina, silica, etc. can be exemplified as the filler. In cases where aluminum hydroxide or magnesium hydroxide is used, incombustibility can be given.

It is preferable that the amount of the filler falls within the range of 100 to 400 weight parts with respect to 100 weight parts resin constituting the intermediate resin layer 3. If the amount is less than 100 weight parts, the dimensional stability deteriorates and there is a disadvantage in respect of costs. To the contrary, if the amount exceeds 400 weight parts, it becomes rigid and fragile and the workability deteriorates. Especially, it is more preferable that the amount of filler falls within the range of 150 to 300 weight parts with respect to the resin 100 weight parts constituting the intermediate resin layer.

It is preferable that the thickness of the intermediate resin layer 3 is 1 to 5 mm. If the thickness is less than 1 mm, enough dimensional stability cannot be obtained. To the contrary, if the thickness exceeds 5 mm, the handling deteriorates because of the increased weight and the workability deteriorates. Especially, it is more preferable that the thickness is 1.5 to 3 mm.

Both of the surface resin layer 2 and the intermediate resin layer 3 may include various additives such as antioxidant, ultraviolet-absorption agent, lubricant, stabilizer, optical stabilizer, flame retarder, colorant, antistatic agent, pattern agent (for an object to improve the design).

The backing layer is a heat-melted heat shrinkage-characteristic cloth integrally formed on a lower surface side of the intermediate resin layer 3. Since a heat-melted heat shrinkage-characteristic cloth is used as the backing layer and that the backing layer 4 is integrally laminated in the state in which distortion causing a contraction of the cloth due to the heating given at the time of laminating remains, an upward-curving of the floor material 1 can be effectively prevented.

As the aforementioned heat shrinkage-characteristic cloth, knitted fabric, woven fabric and nonwoven fabric which are made of heat shrinkage-characteristic fibers can be exemplified. Concretely, as the knitted fabric, victoria lawn can be exemplified. As the nonwoven fabric, polypropylene nonwoven fabric, polyester nonwoven fabric and nylon nonwoven fabric can be exemplified. Especially, it is preferable to use spun bond type nonwoven fabric which can be formed into thinner layers. More preferable one is polypropylene spun bond.

It is preferable that the heat shrinkage ratio of the heat shrinkable cloth in the shape of cloth before being heat-melted is larger than 0% but not larger than 5% at 150° C. If the ratio is 0%, the upward curvature prevention effect of the floor material cannot be obtained. To the contrary, if it exceeds 5%, the downward curvature becomes remarkable to cause deterioration of the construction stability. Especially, it is more preferable that the heat shrinkage ratio falls within the range of 1 to 3%.

Furthermore, it is preferable that the weight per unit area of the backing layer 4 falls within the range of 20 to 150 g/m$^2$ because of the following reasons. If it is less than 20 g/m$^2$, the upward curvature prevention effect of the floor material deteriorates. To the contrary, if it exceeds 150 g/m$^2$, the downward curvature becomes remarkable to deteriorate the fitting stability.

Although the thickness of this non-halogen series floor material 1 according to the present invention is not limited, it generally falls within the range of 2 to 5 mm. Furthermore, the floor material 1 may be a tile-like floor material or a sheet-like floor material (for example, a long sheet-like material with a width of about 600 to 2,500 mm). However, it is not specifically limited to these.

The method for manufacturing the non-halogen series material 1 according to the present invention is not specifically limited, and the non-halogen series material 1 may be manufactured by laminating materials by using, for example, a known apparatus such as an extruder or any other known laminating techniques. Furthermore, the lamination order of the materials is not specifically limited.

Next, concrete examples of the present invention will be explained.

EXAMPLE 1

As shown in Table 1, the compound including 10 weight parts of amorphous propylene-ethylene copolymer (amorphous poly α-olefin resin) whose number average molecular weight is 6,000, 55 weight parts of ethylene-α-olefin copolymer-resin whose number average molecular weight is 160,000, 35 weight parts of polypropylene, 150 weight parts of calcium carbonate, 0.4 weight parts of antioxidant (hindered phenol series antioxidant), 1.2 weight parts of lubricant (phosphate ester series) was mixed with a Banbury mixer, and then made into an intermediate sheet (intermediate resin layer) of 1.8 mm thickness by using a calendar making machine.

On the other hand, a 200 μm thick sheet (surface resin layer) with a triple layer structure (each layer having the same thickness) including an upper layer/an intermediate layer/a lower layer=a polypropylene (PP) resin layer/a polyethylene (PE) resin layer/a polypropylene (PP) resin layer was formed by using a co-extruder, and a predetermined pattern was simultaneously printed on the lower surface thereof by a gravure printing method to thereby obtain an upper layer sheet.

The aforementioned upper sheet, the aforementioned intermediate sheet and a polypropylene spun bond nonwoven fabric (the weight per unit area: 40 g/m$^2$, the heat shrinkage ratio in the nonwoven fabric state before being heat-melted: 2%) were laminated in this order by using a hot lamination machine to thereby obtain a floor material with a thickness of 2.0 mm.

EXAMPLES 2–4

A floor material was obtained in the similar manner as Example 1 except for the conditions such as composition, thickness, etc. of each layer. These conditions are shown in Tables 1 and 2.

EXAMPLE 5

A floor material was obtained in the similar manner as Example 3 except that amorphous polypropylene resin whose number average molecular weight is 4,000 was used in place of amorphous propylene-ethylene copolymer whose number average molecular weight is 6,000.

EXAMPLE 6

A floor material was obtained in the similar manner as Example 3 except for the structure of the surface resin layer. The surface resin layer was a polyproplene single layer (with printing on the lower surface thereof).

EXAMPLES 7 AND 8

A floor material was obtained in the similar manner as Example 1 except for conditions such as composition, thickness, etc. of each layer. These conditions are shown in Table 4.

TABLE 1

|  |  | Example 1 | Example 2 |
|---|---|---|---|
| Surface resin layer | Composition | Triple layer structure PP/PE/PP (with printing on rear surface) | Triple layer structure PP/PE/PP (with printing on rear surface) |
|  | Thickness | 200 μm | 300 μm |
| Intermediate resin layer | Composition | Amorphous propylene-ethylene copolymer: 10 weight parts (The number average molecular weight is 6,000) Ethylene-α olefin copolymer: 55 weight parts (The number average molecular weight is 160,000) Polypropylene: 35 weight parts Calcium carbonate: 150 weight parts Antioxidant: 0.4 weight parts Lubricant: 1.2 weight parts | Amorphous propylene-ethylene copolymer: 15 weight parts (The number average molecular weight is 6,000) Ethylene-αolefin copolymer: 55 weight parts (The number average molecular weight is 160,000) Polypropylene: 30 weight parts Calcium carbonate: 250 weight parts Antioxidant: 0.4 weight parts Lubricant: 1.2 weight parts |
|  | Thickness | 1.8 mm | 1.8 mm |

TABLE 1-continued

|  |  | Example 1 | Example 2 |
|---|---|---|---|
| Backing layer | Material | Polypropylene spun bond | Polypropylene spun bond |
|  | Thermal shrinkage rate | 2% | 2% |
|  | Weight per unit area | 40 g/m$^2$ | 40 g/m$^2$ |

The thermal shrinkage rate of the backing layer is a thermal shrinkage rate in the form of a cloth before being heat-melted.

|  |  | Example 3 | Example 4 |
|---|---|---|---|
| Surface resin layer | Composition | Triple layer structure<br>PP/PE/PP (with printing on rear surface) | Triple layer structure<br>PP/PE/PP (with printing on rear surface) |
|  | Thickness | 200 μm | 400 μm |
| Intermediate resin layer | Composition | Amorphous propylene-ethylene copolymer: 20 weight parts<br>(The number average molecular weight is 6,000)<br>Ethylene-αolefin copolymer: 55 weight parts<br>(The number average molecular weight is 160,000.)<br>Polypropylene: 25 weight parts<br>Calcium carbonate: 250 weight parts<br>Antioxidant: 0.4 weight parts<br>Lubricant: 1.2 weight parts | Amorphous propylene-ethylene copolymer: 25 weight parts<br>(The number average molecular weight is 6,000)<br>Ethylene-αolefin copolymer: 55 weight parts<br>(The number average molecular weight is 160,000)<br>Polypropylene: 20 weight parts<br>Calcium carbonate: 300 weight parts<br>Antioxidant: 0.4 weight parts<br>Lubricant: 1.2 weight parts |
|  | Thickness | 1.8 mm | 1.8 mm |
| Backing layer | Material | Polypropylene spun bond | Polypropylene spun bond |
|  | Thermal shrinkage rate | 2% | 2% |
|  | Weight per unit area | 40 g/m$^2$ | 80 g/m$^2$ |

The thermal shrinkage rate of the backing layer is a thermal shrinkage rate in the form of a cloth before being heat-melted.

TABLE 3

|  |  | Example 5 | Example 6 |
|---|---|---|---|
| Surface resin layer | Composition | Triple layer structure<br>PP/PE/PP (with printing on rear surface) | PP Single layer structure<br>(with printing on rear surface) |
|  | Thickness | 200 μm | 200 μm |
| Intermediate resin layer | Composition | Amorphous polypropylene: 20 weight parts<br>(The number average molecular weight is 4,000)<br>Ethylene-αolefin copolymer: 55 weight parts<br>(The number average molecular weight is 160,000)<br>Polypropylene: 25 weight parts<br>Calcium carbonate: 250 weight parts<br>Antioxidant: 0.4 weight parts<br>Lubricant: 1.2 weight parts | Amorphous propylene-ethylene copolymer: 20 weight parts<br>(The number average molecular weight is 6,000)<br>Ethylene-αolefin copolymer: 55 weight parts<br>(The number average molecular weight is 160,000)<br>Polypropylene: 25 weight parts<br>Calcium carbonate: 250 weight parts<br>Antioxidant: 0.4 weight parts<br>Lubricant: 1.2 weight parts |
|  | Thickness | 1.8 mm | 1.8 mm |
| Backing layer | Material | Polypropylene spun bond | Polypropylene spun bond |
|  | Thermal shrinkage rate | 2% | 2% |
|  | Weight per unit area | 40 g/m$^2$ | 40 g/m$^2$ |

The thermal shrinkage rate of the backing layer is a thermal shrinkage rate in the form of a cloth before being heat-melted.

TABLE 4

|  |  | Example 7 | Example 8 |
|---|---|---|---|
| Surface resin layer | Composition | Triple layer structure<br>PP/PE/PP (with printing on rear surface) | Triple layer structure<br>PP/PE/PP (with printing on rear surface) |
|  | Thickness | 200 μm | 200 μm |
| Intermediate resin layer | Composition | Amorphous propylene-ethylene copolymer: 20 weight parts<br>(The number average molecular weight is 8,000)<br>EPDM(Ethylene-propylene rubber): 55 weight parts<br>(The number average molecular weight is 170,000)<br>Polypropylene: 25 weight parts | Amorphous propylene-ethylene copolymer: 25 weight parts<br>(The number average molecular weight is 6,000)<br>Ethylene-αolefin copolymer: 55 weight parts<br>(The number average molecular weight is 160,000)<br>Polyethylene: 20 weight parts |

TABLE 4-continued

| | | Example 7 | Example 8 |
|---|---|---|---|
| Backing layer | | Calcium carbonate: 250 weight parts<br>Antioxidant: 0.4 weight parts<br>Lubricant: 1.2 weight parts | Calcium carbonate: 250 weight parts<br>Antioxidant: 0.4 weight parts<br>Lubricant: 1.2 weight parts |
| | Thickness | 1.8 mm | 1.8 mm |
| | Material | Polypropylene spun bond | Polypropylene spun bond |
| | Thermal shrinkage rate | 1.5% | 3% |
| | Weight per unit area | 40 g/m$^2$ | 80 g/m$^2$ |

The thermal shrinkage rate of the backing layer is a thermal shrinkage rate in the form of a cloth before being heat-melted.

COMPARATIVE EXAMPLE 1

The amount of amorphous poly α-olefin resin (the number average molecular weight: 6,000) in the intermediate resin layer was set as shown in Table 5, and was kneaded. However, the calcium carbonate was not mixed completely, and therefore an appropriate intermediate sheet could not be obtained. That is, a large amount of the filler could not be contained since the amount of amorphous poly α-olefin resin was too small.

COMPARATIVE EXAMPLE 2

Accordingly, the amount of calcium carbonate was decreased until the calcium carbonate was mixed completely as shown in Table 6. Thus, a floor material was obtained. The remaining conditions were the same as Example 3.

COMPARATIVE EXAMPLE 3

A floor material was obtained in the same manner as Example 3 except that the amount of amorphous poly α-olefin resin (the number average molecular weight: 6,000), etc. were set as shown in Table 6.

COMPARATIVE EXAMPLES 4 AND 5

A floor material was obtained in the same manner as Example 3 except that the thickness of the surface resin layer was set as shown in Table 7.

TABLE 5

| | | Comparative Example 1 |
|---|---|---|
| Surface resin layer | Composition | — |
| | Thickness | — |
| Intermediate resin layer | Composition | Amorphous propylene-ethylene copolymer: 3 weight parts<br>(The number average molecular weight is 6,000)<br>Ethylene α-olefin copolymer: 6.7 weight parts<br>(The number average molecular weight is 160,000)<br>Polypropylene: 30 weight parts<br>Calcium carbonate: 250 weight parts<br>Antioxidant: 0.4 weight parts<br>Lubricant: 1.2 weight parts |
| | Thickness | 1.8 mm |
| Backing layer | Material | — |
| | Thermal shrinkage rate | — |
| | Weight per unit area | — |

The calcium carbonate was not mixed completely and therefore an appropriate intermediate sheet could not be obtained. Thus, a floor material could not be formed.

TABLE 6

| | | Comparative Example 2 | Comparative Example 3 |
|---|---|---|---|
| Surface resin layer | Composition | Triple layer structure<br>PP/PE/PP (with printing on rear surface) | Triple layer structure<br>PP/PE/PP (with printing on rear surface) |
| | Thickness | 200 μm | 200 μm |
| Intermediate resin layer | Composition | Amorphous propylene-ethylene copolymer: 3 weight parts<br>(The number average molecular weight is 6,000)<br>Ethylene-α-olefin copolymer: 67 weight parts<br>(The number average molecular weight is 160,000)<br>Polypropylene: 30 weight parts<br>Calcium carbonate: 50 weight parts<br>Antioxidant: 0.4 weight parts<br>Lubricant: 1.2 weight parts | Amorphous propylene-ethylene copolymer: 45 weight parts<br>(The number average molecular weight is 6,000)<br>Ethylene-α-olefin copolymer: 30 weight parts<br>(The number average molecular weight is 160,000)<br>Polypropylene: 25 weight parts<br>Calcium carbonate: 250 weight parts<br>Antioxidant: 0.4 weight parts<br>Lubricant: 1.2 weight parts |
| | Thickness | 1.8 mm | 1.8 mm |
| Backing layer | Material | Polypropylene spun bond | Polypropylene spun bond |
| | Thermal shrinkage rate | 2% | 2% |
| | Weight per unit area | 40 g/m$^2$ | 40 g/m$^2$ |

The thermal shrinkage rate of the backing layer is a thermal shrinkage rate in the form of a cloth before being heat-melted.

TABLE 7

| | | Comparative Example 4 | Comparative Example 5 |
|---|---|---|---|
| Surface resin layer | Composition | Triple layer structure PP/PE/PP (with printing on rear surface) | Triple layer structure PP/PE/PP (with printing on rear surface) |
| | Thickness | 200 μm | 1500 μm |
| Intermediate resin layer | Composition | Amorphous propylene-ethylene copolymer: 20 weight parts (The number average molecular weight is 6,000) Ethylene-αolefin copolymer: 55 weight parts (The number average molecular weight is 160,000) Polypropylene: 25 weight parts Calcium carbonate: 250 weight parts Antioxidant: 0.4 weight parts Lubricant: 1.2 weight parts | Amorphous propylene-ethylene copolymer: 20 weight parts (The number average molecular weight is 6,000) Ethylene-αolefin copolymer: 55 weight parts (The number average molecular weight is 160,000) Polypropylene: 25 weight parts Calcium carbonate: 250 weight parts Antioxidant: 0.4 weight parts Lubricant: 1.2 weight parts |
| | Thickness | 1.97 mm | 1.5 mm |
| Backing layer | Material | Polypropylene spun bond | Polypropylene spun bond |
| | Thermal shrinkage rate | 2% | 2% |
| | Weight per unit area | 40 g/m$^2$ | 40 g/m$^2$ |

The thermal shrinkage rate of the backing layer is a thermal shrinkage rate in the form of a cloth before being heat-melted.

The following tests were conducted to each floor material obtained as mentioned above. The results are shown in Table 8.

TABLE 8

| | Example | | | | | | | | Comparative Example | | | |
|---|---|---|---|---|---|---|---|---|---|---|---|---|
| | 1 | 2 | 3 | 4 | 5 | 6 | 7 | 8 | 2 | 3 | 4 | 5 |
| Wear resistance | ◎ | ◎ | ◎ | ◎ | ◎ | ◎ | ◎ | ◎ | ◎ | ◎ | x | ◎ |
| Stain resistance | ◎ | ◎ | ◎ | ◎ | ◎ | ◎ | ◎ | ◎ | ◎ | ◎ | ◎ | ◎ |
| Dimensional stability | ◎ | ◎ | ◎ | ◎ | ◎ | ◎ | ◎ | ◎ | x | x | ○ | ○ |
| Workability | ○ | ◎ | ◎ | ○ | ◎ | ○ | ◎ | ◎ | x | ◎ | ○ | x |
| Curvature tightness | ◎ | ◎ | ◎ | ◎ | ◎ | ◎ | ◎ | ◎ | ◎ | ◎ | ◎ | x |

<Wear Resistant Test>

In accordance with the friction test method for a building material and a construction structural portion by JIS A1453, the surface of each floor material was ground with a taper grinding test machine with a grinding ring on which a predetermined sandpaper was wound by rotating 1000 times. Then, the abrasion loss (g) was measured. The results are shown in Table 8. In this table, "◎," "○" and "x" denote an abrasion loss of "0.25 g or less," "0.25 to 0.30 g" and "0.3 g or more," respectively.

<Stain Resistant Test>

In accordance with the stain test of a vinyl series floor material by JIS A5705, 2 mL of contamination material was dropped on the surface of each floor material and kept for 24 hours, then washed with water containing neutral detergent, then further washed with alcohol, then wiped off with gauze, then kept for 1 hour. Then, the changes of color, luster and blister of the portion on which the contamination material was dropped were visually observed. The results are shown in Table 8. In this Table, "◎" denotes that no change was observed, and "x" denotes that at least one of changes was observed.

<Dimensional Stability Test>

In accordance with the length change test by heating a vinyl series floor material by JIS A5705, after heating each floor material at 80° C. for 6 hours, each floor material was left indoors for 1 hour. Then, the rate of change to the length before heating was measured. The results are shown in Table 8. In this Table, "◎" denotes that the rate of change is less than 1.0%, "○" denotes that the rate of change is 1.0 to 1.5%, and "x" denotes that the rate of change exceeds 1.5%.

<Workability Test>

In the test results shown in Table 8, "◎" denotes "excellent in flexibility, excellent in workability and good in fitting to a bedding (floor surface to be applied)," "○" denotes "good in flexibility, workability and fitting to a bedding," and "x" denotes "insufficient in flexibility, poor in workability and poor in fitting to a bedding."

<Curvature Tightness Test>

In accordance with the curvature test of a tile carpet of JIS L4406, a floor material specimen (cut into 50 cm×50 cm) was placed on a stainless steel plate with a thickness of 3 mm specified by JIS G4305, kept horizontally for 24 hours in a standard state (20±2° C., 65±2% RH), then laid on a horizontal test rack, and then the magnitude of the gap between each specimen and the test table at the four corners of each specimen were measured. In Table 8, "◎" denotes that the total gaps between each specimen and the test table was less than 1.0 mm, "○" denotes that the total gaps between each specimen and the test table was not smaller than 1.0 mm but not larger than 1.5 mm, and "x" denotes that the total gaps between each specimen and the test table was 1.5 mm or more.

As is apparent from Table 8, the floor materials of Examples 1 to 8 of the present invention were excellent in wear resistance, stain resistance, dimensional stability, workability and curvature tightness.

The floor material of Comparative Example 2, in which the amount of amorphous poly α-olefin resin whose number average molecular weight was 20,000 or less in the intermediate resin layer was set below the range defined by the present invention and therefore calcium carbonate was not mixed completely, was poor in dimensional stability and workability. Furthermore, the floor material of Comparative Example 3, in which the amount of amorphous poly α-olefin resin whose number average molecular weight was 20,000 or less in the intermediate resin layer was set above the range defined by the present invention, was poor in dimensional stability and heat resistance. Furthermore, the floor material of Comparative Example 4 in which the thickness of the surface resin layer was set below the range defined by the present invention, was insufficient in wear resistance. Furthermore, the floor material of Comparative Example 5 in which the thickness of the surface resin layer was set above the range defined by the present invention was poor in workability and curvature tightness.

Furthermore, an NBS combustion test and the flame proofness test (Fire Service Law) were performed about the floor material of Example 2. These results are shown in Table 9.

In the NBS combustion test method, a specimen is perpendicularly placed in a sealed smoke emitting box and burned while applying radiant heat from a heater in front of the specimen and also applying a flame of a burner. The rate of light transmission of the smoke generated in the smoke emitting box is measured with a photoelectric tube. Then, the smoke density (Ds) is calculated from this rate of light transmission (T) using the following calculation formula: $Ds = 132 \log(100/T)$.

The Ds value and the maximum Ds value at the time of 4 minutes after the test start were calculated. Furthermore, the gas in the smoke emitting box was kept in a Teflon bag, and the generating gas was analyzed.

TABLE 9

| NBS Combustion Test | Smoking nature (Ds value) | 4 minutes later | 14 |
|---|---|---|---|
| | | Maximum | 66 |
| | Analysis of generated gases | CO | 50 ppm |
| | | HCN | 0 ppm |
| | | HCl | 0 ppm |
| | | HF | 0 ppm |
| | | $SO_2$ | 0 ppm |
| | | $NO + NO_2$ | 10 ppm |
| | Flame Proofness Test | | Pass |

Ds: Smoke Density

As clear from Table 9, it is confirmed that the floor material of the present invention is low in smoke generation at the time of burning and that toxic gases are hardly generated.

According to this floor material of the present invention, since resin having no chlorine atom in chemical structure is used as resin materials, the floor material generates less smoke, less toxic gases at the time of burning, which is excellent in burning safety and environment conservation. Furthermore, since the surface resin layer is made of resin and that the thickness of the surface resin layer is set to 30 μm or more, it is excellent in wear resistance and stain resistance. In addition, since the thickness of the surface resin layer is set 1,000 μm or less and that the intermediate resin layer contains filler, it is excellent in dimensional stability and up-curvature tightness. Furthermore, since the amorphous poly α-olefin resin whose number average molecular weight is 20,000 or less is contained as resin constituting the intermediate resin layer by 5 to 40% by weight with respect to the entire resin ingredients constituting the intermediate resin layer, a large amount of filler can be contained, resulting in improved dimensional stability and flexibility, which in turn can improve the workability of the floor material. Thus, since it is extremely excellent in dimensional stability, even in cases where it is used as a floor material which is required in excellent dimensional stability like a homo zinnia style one, there is an advantage that it can be used without requiring an insertion of a glass nonwoven fabric, etc. Furthermore, since the heat shrinkage-characteristic cloth is heat-melted to thereby integrally form a backing layer on the lower surface of the intermediate resin layer, the up-curvature of the floor material can be effectively prevented. In addition, since it is not required to contain plasticizer, the specific odor will not be emitted and that dull deposits will not gradually generate on the surface of the floor material, resulting in excellent durability.

In cases where the surface resin layer is a monolayer structure containing olefin series resin as a main resin ingredient or a lamination structure in which at least the uppermost surface layer contains olefin series resin as a main resin ingredient, the wear resistance and the stain resistance can be further improved.

In the above structure, in cases where polypropylene resin is used as olefin series resin, the wear resistance and the stain resistance can be further enhanced.

In cases where the amount of the filler contained in the intermediate resin layer is 100 to 400 weight parts with respect to 100 weight parts of resin constituting the intermediate resin layer, the workability can be further improved while keeping the excellent dimensional stability.

In cases where the heat shrinkage ratio of the heat shrinkage-characteristic cloth in a shape of cloth before being heat-melted is larger than 0% but not larger than 5% at 150° C., the generation of the up-curvature of the floor material can be effectively prevented, and the fitting stability of the floor material can be further improved since the floor material tends to be curved downwardly In cases where the weight per square unit area of the backing layer falls within the range of 20 to 150 g/m$^2$, there are advantages that the fitting stability can be further improved while effectively preventing the up-curvature of the floor material.

While illustrative embodiments of the present invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A non-halogen series floor material, comprising:
    an intermediate resin layer containing filler, resin (except for amorphous poly α-olefin resin whose number average molecular weight is 20,000 or less) having no chlorine atom in chemical structure as a primary resin ingredient and amorphous poly α-olefin resin whose number average molecular weight is 20,000 or less, the content of said amorphous poly α-olefin resin being 5 to 40% by weight with respect to entire resin ingredients;
    a surface resin layer having a thickness of 30 to 1,000 μm integrally formed on an upper surface of said intermediate resin layer, said surface resin layer including no chlorine atom in chemical constitution; and a backing layer integrally formed on a lower surface of said intermediate resin layer, said backing layer being a polypropylene spun bond nonwoven fabric, wherein said surface resin layer is a monolayer structure containing polypropylene resin as a main resin ingredient or a lamination structure in which at least the uppermost surface layer contains polypropylene resin as a main resin ingredient.

2. The non-halogen series floor material as recited in claim 1, wherein a thickness of said surface resin layer is 200 to 600 μm.

3. The non-halogen series floor material as recited in claim 1, wherein said intermediate resin layer contains 15 to 25% by weight amorphous poly α-olefin resin with respect to the entire resin ingredients, said number average molecular weight of said amorphous poly α-olefin resin being 20,000 or less.

4. The non-halogen series floor material as recited in claim 1, wherein the number average molecular weight of said amorphous poly α-olefin resin falls within the range of 1,000 to 10,000.

5. The non-halogen series floor material as recited in claim 1, wherein said amorphous poly α-olefin resin is one or a plurality of resins selected from the group consisting of amorphous polypropylene resin, amorphous propylene-ethylene copolymer resin and amorphous propylene-butene-1 copolymer resin.

6. The non-halogen series floor material as recited in claim 1, wherein an amount of said filler contained in said intermediate resin layer is 100 to 400 weight parts with respect to 100 weight parts of resin constituting said intermediate resin layer.

7. The non-halogen series floor material as recited in claim 1, wherein an amount of said filler contained in said intermediate resin layer is 150 to 300 weight parts to 100 weight parts of resin constituting said intermediate resin layer.

8. The non-halogen series floor material as recited in claim 1, wherein a thickness of said intermediate resin layer is 1 to 5 mm.

9. The non-halogen series floor material as recited in claim 1, wherein a thickness of said intermediate resin layer is 1.5 to 3 mm.

10. The non-halogen series floor material as recited in claim 1, wherein said resin including no chlorine atom in chemical constitution is olefin series resin (except for amorphous poly α-olefin resin whose number average molecular weight is 20,000 or less).

11. The non-halogen series floor material as recited in claim 1, wherein a weight per square unit area of said backing layer falls within the range of 20 to 150 g/m$^2$.

12. The non-halogen series floor material as recited in claim 1, wherein a thickness of said floor material falls within the range of from 2 to 5 mm.

* * * * *